July 16, 1940.　　　　H. J. MURPHY　　　　2,208,546
HANDLE DEVICE
Filed July 30, 1937
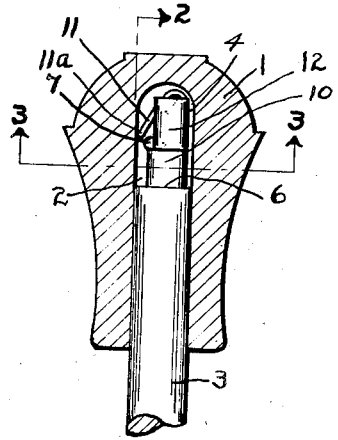
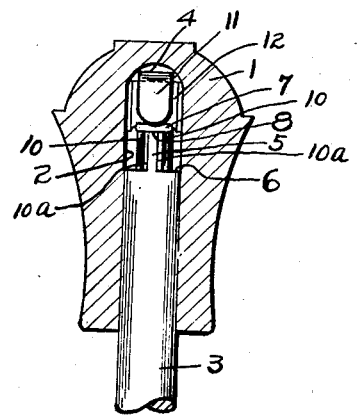
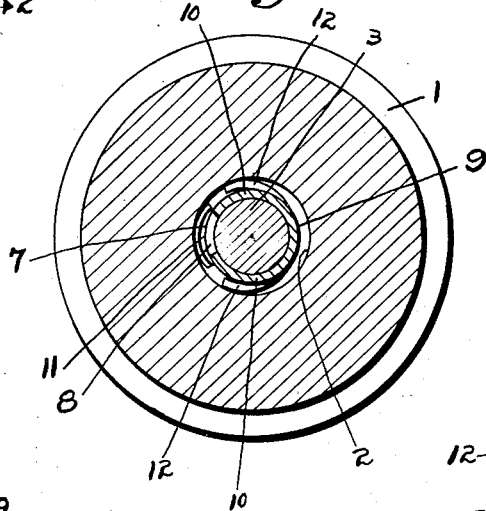
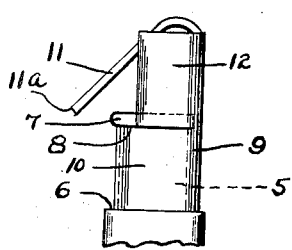
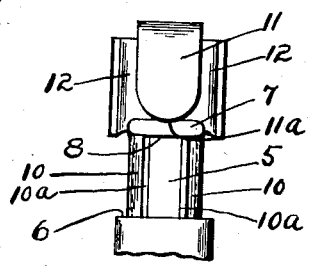
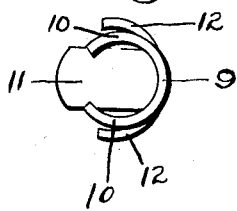
Inventor:
Howard J. Murphy.
By Walter J. Jones
Att'y.

Patented July 16, 1940

2,208,546

UNITED STATES PATENT OFFICE 2,208,546

HANDLE DEVICE

Howard J. Murphy, Greenwood, Mass., assignor to United-Carr Fastener Corporation, Cambridge, Mass., a corporation of Massachusetts Application July 30, 1937, Serial No. 156,517

7 Claims. (Cl. 287—91)

My invention aims to provide improvements in fasteners for attaching knobs, handles or the like to shafts.

An object of my invention is the provision of a handle for cranks and the like which is secured to a shaft by a fastener means enclosed within the handle, the fastener means being attached to the shaft in such a way that the handle is capable of turning freely on the shaft but is secured against separation from the shaft.

One of the main features of my improved device is the particular construction of the parts thereof enabling the component parts to be readily assembled together without the use of tools.

Referring to the drawing, in which I have illustrated a preferred embodiment of my invention:

Figure 1 is a longitudinal section of my handle device with the shaft and fastener member shown in elevation;

Fig. 2 is a section taken along the line 2—2 of Fig. 1;

Fig. 3 is an enlarged section taken along the line 3—3 of Fig. 1;

Fig. 4 is a side view of my fastener member and part of the shaft member;

Fig. 5 is a front view of the combination shown in Fig. 4; and

Fig. 6 is an end view of my fastener member per se.

Referring to my preferred handle device as illustrated in the drawing, I have provided a knob or handle member 1 having a shaft-receiving opening or bore 2 and rotatably fixed to a shaft 3 by means of my improved fastener member 4. The fastener member 4 is entirely concealed within the handle 1 and has means rotatably engaged with a portion of the shaft 3 adjacent an end thereof so as to secure the handle to the shaft, and attaching means frictionally engaging material of the handle 1 adjacent the bore 2 for securing the shaft to the handle.

The shaft member 3, in my preferred form, has a portion of reduced diameter at one end in the form of a neck 5 providing a frontwardly facing shoulder 6 (Figs. 4 and 5). At the free end of the neck 5 I have provided a head portion 7 forming a rearwardly facing shoulder 8. The fastener member 4 of my device has means adapted to engage the neck portion 5 so as to permit relative rotation of the fastener member and the shaft with the oppositely-facing shoulders 6 and 8 arranged to limit longitudinal movement of the fastener member on the shaft.

Referring in detail to my fastener member 4, I have provided a fastener formed preferably from one piece of spring metal. My preferred form of fastener member has a back portion 9 (Fig. 6) with resilient side portions in the form of arms 10 extending from opposed sides thereof adjacent one end and having a length which is slightly less than the distance between the shoulders 6 and 8. The side portions are bent to form a substantially enclosed region having a greater diameter than that of the neck portion 5 so that the side portions may rotate freely around the neck portion. The free edges 10ª of the portions 10 (Fig. 5) are separated throughout their lengths and are disposed a distance apart which is less than the diameter of the neck 5 so that the side portions may be snapped over the neck 5 into fastened engagement with the same. It will be noticed that when the side portions 10 are in engagement with the neck 5 of the shaft member, the shoulders 6 and 8 limit longitudinal movment of the arms relative to the shaft member. As a means for securing the shaft to the handle, I have provided an attaching portion in the form of a spring tongue 11 integral with an opposite end of the back portion 9 from that having the portions 10. The spring tongue 11 is bent laterally at an angle to the back portion 5 with the free end 11ª of the tongue facing toward that end of the fastener having the side portions 10. It is important to notice that the spring tongue is constructed in such a way that the distance between edges of the tongue at the free end thereof and the base portion 5 is greater than the diameter of the bore 2 whereby the edges of the free end of the tongue engage material of the handle adjacent the bore so that when pull force is exerted upon the shaft member 3 for withdrawing the shaft member from the handle, the edges of the free end of the tongue bite into the wall of the bore and resist such withdrawal. As a means for preventing lateral play between the parts of my device, I have provided, in my preferred form, a pair of wings 12 extending from opposed sides of the back portion 9 between the portions 10 and the end of the back portion with which the tongue 11 is integral. The wing portions 12 are bowed slightly to follow the contour of the material of the handle 1 adjacent the bore 2 and are adapted to abut the wall of the bore when the fastener member is finally seated within the bore, as most clearly shown in Figs. 2 and 3, so as to prevent lateral movement of the fastener member relative to the bore.

In assembling the parts of the device here shown, the spaced edges 10ª of the resilient side portions 10 of the fastener member are moved toward the neck 5 and snapped over the same so as to secure the fastener member to the shaft. As a result of the fact that the diameter of the region enclosed by the side portions 10 is slightly greater than the diameter of the neck 5, the shaft member may rotate freely relative to the arms. Finally, the handle 1 is pushed over the fastener member 4 until the fastener member abuts the closed end of the bore 2. When the fastener member is seated in final position within the bore of the handle, the spring tongue 11 is compressed slightly and frictionally engages the wall of the bore (Fig. 1) so that if either the handle member or the shaft member be pulled relative to the other for the purpose of separating the parts, an edge of the tongue 11 at the free end thereof bites into the wall of the bore with the result that the parts are secured against longitudinal movement although the handle and shaft members may turn relative to each other with the fastener member turning with the handle member.

Thus by my invention I have provided a handle device, the component parts of which may be easily assembled, without the use of tools, to provide a strong and efficiently-operating installation. The handle device, which is the subject of the present application, is particularly useful in combination with crank handles, such as used for raising and lowering automobile window panes or other devices.

Although I have illustrated and described a preferred form of my invention, I do not wish to be limited thereby because the scope of my invention is best set forth in the following claims.

I claim:

1. In combination, a shaft having a reduced portion at one end forming a neck and a frontwardly facing shoulder and a head at the free end of said neck forming a rearwardly facing shoulder, an operating handle having a bore and a fastener member comprising a back portion and side portions extending from opposite sides of said back portion and engaging said neck portion for securing the fastener and shaft together, and said fastener member having yieldable means movable independently of said side portions disposed within said bore and engaging the material of said handle adjacent said bore for attaching said shaft to said handle.

2. The combination with a shaft and an operating handle having a bore of a one-piece fastener member comprising a back portion, a shaft-engaging means integral with said back portion for securing said fastener to said shaft, and a spring tongue movable independently of said shaft-engaging means and extending laterally from said back portion with the free end of said tongue disposed toward the open end of said bore, said free end of said tongue adapted to engage material of said handle adjacent said bore for attaching said shaft to said handle.

3. The combination with a shaft and an operating handle having a bore of a one-piece fastener member comprising a back portion, side portions integral with opposed sides of said back portion at one end thereof and embracing a portion of said shaft for securing said fastener to said shaft, and a spring tongue movable independently of said shaft-engaging means and extending laterally from said back portion with the free end of said tongue disposed toward the open end of said bore, said free end of said tongue engaging material of said handle adjacent said bore for attaching said shaft to said handle.

4. The combination with a shaft and an operating handle having a bore of a fastener member comprising a back portion, a shaft-engaging means extending from said back portion for securing said fastener to said shaft, a spring tongue extending laterally from said back portion with the free end of said tongue disposed toward the open end of said bore, said free end of said tongue engaging material of said handle adjacent said bore for attaching said shaft to said handle, and wing portions integral with opposed sides of said back portion and disposed on opposite sides of said tongue, said wing portions engaging material of said handle adjacent said bore for preventing lateral movement of said fastener member relative to said bore.

5. The combination with a shaft and an operating handle having a bore of a fastener member seated within said bore, said fastener member comprising a back portion, a shaft-engaging means integral with said back portion at one end thereof for securing said fastener to said shaft, a spring tongue extending laterally from the other end of said back portion with the free end of said tongue disposed toward the open end of said bore, said free end of said tongue adapted to engage material of said handle adjacent said bore for attaching said shaft to said handle, and laterally extending wing portions integral with opposed sides of said back portion and disposed on opposite sides of said tongue, said wings being of bowed construction to follow the contour of the material of said handle adjacent said bore and abut said material for preventing lateral movement of said fastener member relative to said bore.

6. In combination, a shaft having a reduced portion at one end forming a neck and a frontwardly facing shoulder and a head at the free end of said neck forming a rearwardly facing shoulder, an operating handle having a bore therein and a fastener member having a back portion and side portions extending from the sides of said back portion and being bent to partially encircle said neck with a pair of edges separated throughout their entire length, said edges being a distance apart which is less than the diameter of said neck and being adapted to snap over said neck whereby said side portions rotatively engage said neck, said shoulders preventing longitudinal movement of said side portions relative to said neck, and said back portion having an attaching portion movable independently of said side portions and adapted to frictionally engage the material of said handle adjacent said bore for attaching said shaft to said handle.

7. In combination, a shaft having a reduced portion at one end forming a neck and a frontwardly facing shoulder and a head at the free end of said neck forming a rearwardly facing shoulder, an operating handle having a bore therein and a fastener member having a back portion and a pair of spaced side portions extending from said back portion, said side portions shaped and arranged to partially encircle said neck portion between said shoulders for securing said fastener member in turning relation to said shaft, and said back portion having an attaching portion movable independently of said side portions and adapted to engage the material of said handle adjacent said bore for attaching said shaft to said handle.

HOWARD J. MURPHY.